W. A. TURBAYNE.
SYSTEM OF ELECTRICAL DISTRIBUTION.
APPLICATION FILED JUNE 15, 1916.
1,389,326.
Patented Aug. 30, 1921.
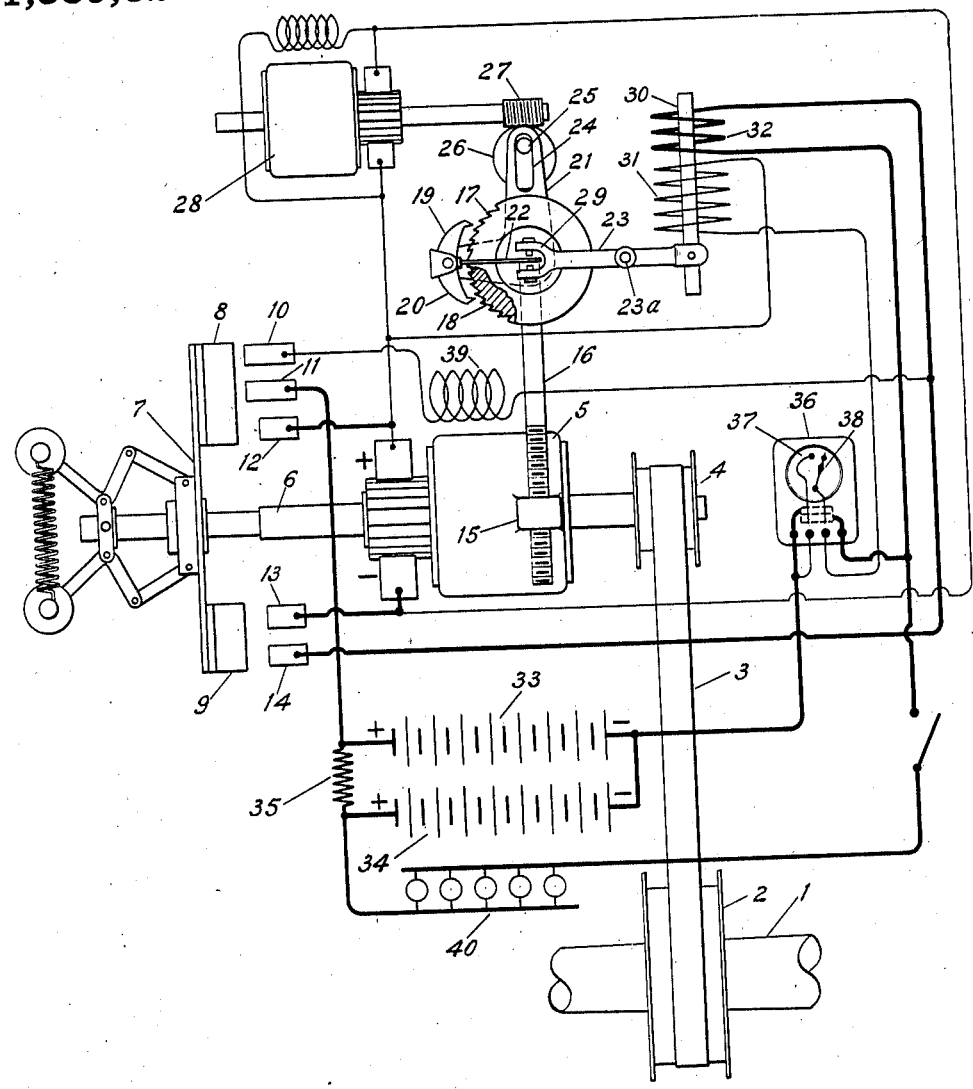
Inventor
William A. Turbayne
Witnesses
Burr N. Caldwell
Ralph Munden.
By Raymond H. Van Vest.
Attorney

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

SYSTEM OF ELECTRICAL DISTRIBUTION.

1,389,326.  Specification of Letters Patent.  Patented Aug. 30, 1921.

Application filed June 15, 1916. Serial No. 103,744.

*To all whom it may concern:*

Be it known that I, WILLIAM A. TURBAYNE, a citizen of the United States, residing at Niagara Falls, in the county of Niagara and State of New York, have invented new and useful Improvements in Systems of Electrical Distribution, of which the following is a specification.

The present invention relates to systems of electrical distribution.

More particularly the invention relates to systems of electrical distribution applicable to the lighting of railway cars in which the current output is maintained substantially constant, such, for instance, as the well known Stone system of car lighting. The salient feature of the Stone system of car lighting is the means by which the current output is controlled. In this system the generator is adjustably mounted relative to the car axle, a belt being used to connect the two. Due to the adjustability of the generator, the belt may be permitted to slip when the generator output tends to rise above a predetermined value, thus limiting the generator output to said predetermined value. In the description which follows, one means for determining the adjustment of the generator will be described.

An object of the present invention is to provide a system of electrical distribution in which the adjustment of the generator relative to the car axle is governed in response to the state of battery charge.

A further object is to provide a system of the kind referred to in which the generator output will be maintained substantially constant during the charging of the storage battery but will be cut off when the battery has reached a state of full charge.

A further object is to provide a system of the kind referred to in which an ampere hour meter, or a similar measuring device, is adapted to control the adjustment of the generator.

A further object is to provide a system of the kind referred to in which, when the battery is fully charged, the generator output will be cut off, but in which there will be no tendency for the generator armature to race, due to the decreased load.

Further objects will be apparent as the description proceeds.

The single figure of the drawing illustrates diagrammatically one embodiment of the present invention.

The car axle is indicated by the numeral 1. Said axle is provided with a pulley 2, which may be connected through a belt 3 to a pulley 4 on the generator 5. Said generator 5 is provided with a shaft 6 upon which is slidably mounted a centrifugally operable member 7 provided with switch blades 8 and 9. Said switch blades 8 and 9 are adapted to coöperate with stationary switch blades 10 to 14 inclusive, connected as illustrated in the drawing.

Connected in any suitable manner to the frame of the generator 5 is a member 15 internally screw-threaded. Coöperating with said member 15 is a screw-threaded shaft 16. As the shaft 16 is turned in one direction or the other, the member 15, and therefore the generator 5, will be moved to either tighten or relax the belt 3. The connection between the shaft 16 and the generator 5 is indicated diagrammatically, but the illustration will be sufficient to show the principle on which the mechanism operates.

Mounted upon the shaft 16 are a pair of ratchet wheels 17 and 18 having teeth pointing in opposite directions. In the drawing, the axis of the ratchet wheels 17 and 18 is indicated as being at right angles to the axis of the shaft 16, which, of course, would not be the case if said ratchets were mounted directly upon the shaft 16. However, it will be understood that the drawing is intended to illustrate the fact that when the ratchets 17 or 18 are turned in one direction or the other, the shaft 16 will be correspondingly turned. Coöperating with the ratchet 17 is a pawl 19. Similarly coöperating with the ratchet 18 is the pawl 20. Said pawls 19 and 20 are rigidly connected together and are pivotally mounted on the bell crank lever 21. The position of the pawls 19 and 20 is determined by the arm or stem 22. It will be apparent that when said stem 22 is depressed, the pawl 19 will engage the ratchet 17, whereas pawl 20 will be free from ratchet 18. When said stem 22 is in its raised position, pawl 19 will be free from ratchet 17, while pawl 20 will be in engagement with ratchet 18. The position of the stem 22 is governed by the position of the lever arm 23, which is pivoted at 23ᵃ, the function of which will be presently described.

The bell crank lever 21 may be oscillatably mounted upon the same shaft as the ratchets 17 and 18. Said bell crank lever 21 is provided with a slot 24 adapted to receive the crank pin 25, which crank pin 25 is offset from the center of a worm wheel 26. It will be clear that as the worm wheel 26 is turned, the crank pin 25 will oscillate the bell crank lever 21. If either pawl 19 or pawl 20 is in engagement with its corresponding ratchet wheel, a rotation of the shaft 16 will result. The worm wheel 26 is rotated by means of a worm 27 which is adapted to be rotated by a pilot motor 28.

The lever arm 23, governing the position of the stem 22, is provided with a yoke 29 straddling said stem. The lever arm 23 is operated by a core member 30, which is governed by a voltage coil 31 and a series coil 32, which will be referred to further hereinafter.

In the system disclosed in the drawing, two storage batteries 33 and 34 are shown, having terminals of like polarity, indicated as negative, connected together. The other terminals of the batteries are connected together through a resistance 35. The negative terminals are connected to an ampere hour meter 36, the other side of said ampere hour meter being connected to one of the current carrying conductors of the system. The ampere hour meter 36 may be of any preferred construction, but should preferably be of the type which automatically changes its rate of registration upon the reversal of current flowing therethrough. Such an ampere hour meter may be calibrated to compensate for battery inefficiency, so that it will at all times register the available amount of charge in the storage batteries. Said ampere hour meter is provided with a stationary contact 37 and a movable contact 38 which, when closed, will close the circuit of the voltage coil 31. The generator 5 is provided with a shunt field winding 39, circuit to which will be open when the generator is inoperative.

Two storage batteries have been illustrated for the reason that two storage batteries are often used in the physical embodiments of the Stone system. Switches are provided in practice for the purpose of transposing the storage batteries at intervals and for short-circuiting resistance 35 when it is desirable to throw the batteries 33 and 34 into strict parallel relation. Such switches are not illustrated on the drawing, as they constitute no part of the present invention. It will be evident, without further explanation, to those skilled in the art, that one of the batteries 33 or 34, will be in position to be charged by the generator 5, while the other operates to regulate the voltage upon the translation circuit 40. Instead of using the two batteries, only one battery may be used, if desired, in which case, of course, the resistance 35 would be eliminated.

The various connections will be apparent from the drawing and will be further explained in the statement of one mode of operation of the system, as follows. Starting with the car axle motionless, the member 7 will be in the position illustrated in the drawing. When the car axle is rotated, the belt 3 will drive the shaft 6. When the shaft 6 is rotating at a sufficient speed, the centrifugally operable member 7 will be moved to the right, engaging the switch blade 8 with contacts 10 and 11. Current will now pass from the positive side of the battery 33, through contact 8, generator field circuit 39, series coil 32, ampere hour meter 36, to the negative side of the battery. The generator 5 is thus energized and generates current which flows from the positive side of the generator, through the pilot motor 28 to the negative side of the generator. The pilot motor 28 will be driven to rotate the worm wheel 26 and thereby oscillate the bell crank lever 21. At this time inasmuch as the energization of the series coil 32 is low in value, the core 30 will be in its lowermost position, whereby the pawl 20 will be in engagement with the ratchet wheel 18. Oscillation of the bell crank lever 21 will therefore operate through the pawl 20, ratchet wheel 18 and screw-threaded shaft 16 to move the generator 5 into a position to tighten the belt 3. The tightening of the belt 3 results in a quickening of the speed of the generator shaft 6. The centrifugally operable member 7 is thrown to its extreme right hand position, throwing contact 8 into contact with contacts 10, 11, and 12 and throwing contact 9 into contact with contacts 13 and 14. The current generated by the generator 5 now flows from the positive terminal of the generator through contacts 12, 8 and 11 to the storage batteries, thence through the ampere hour meter 36, through the coil 32 and contacts 14, 9 and 13, back to the negative terminal of the generator. If the lamp circuit is closed, a part of the generator current will flow to the lamps. This lamp current will not be measured by the ampere hour meter 36, inasmuch as said ampere hour meter is in the battery branch. Neither will any local circuit current between the batteries 33 and 34 be measured by the ampere hour meter. Said ampere hour meter will register only the net charge and discharge of said storage batteries, the movable contact of said meter being rotated in one direction by the charging current flowing into the batteries and being rotated in the opposite direction by the discharging current from the storage batteries. The pawl and ratchet mechanism 20, 18, will continue to rotate the screw-threaded shaft 16 until the belt 3 has been put under proper tension to produce the desired current output of the generator, which output is measured by the series coil 32. Upon any increase in the current output above a predetermined value, the core 30 will be raised to throw pawl 20 out of engagement with the ratchet wheel 18. If the current output tends to rise too high, the pawl 19 will be thrown into engagement with the ratchet wheel 17, rotating the screw-threaded shaft 16 in the opposite direction to relax the tension on the belt 3 and allow said belt to slip. The current output of the generator will thus be maintained at the predetermined value.

When a sufficient number of ampere hours have been delivered to the storage batteries to charge the same, the movable contact 38 will come into contact with the fixed contact 37 of the ampere hour meter and will close a circuit from the positive side of the battery 33 to contacts 11, 8, 12, voltage coil 31, contact 38, contact 37, to the negative side of the battery. The coils 31 and 32 being wound cumulatively, will exert a pulling effect on the core 30 to throw the pawl 19 into engagement with the ratchet wheel 17 to rotate the shaft 16 in a direction to relax the tension on the belt. The effect of the coil 31, added to the effect of coil 32, will preferably be sufficiently great to reduce the tractive effect of the belt 3 on the pulley 4 to reduce the generator voltage to the floating voltage of the battery. No current will now flow in the coil 32 and coil 31 will govern the ratchet mechanism to maintain the proper tractive effect on the belt. Therefore, though the load is thrown off the generator, there will be no tendency for the generator to race.

I have described one embodiment of the present invention in detail. Various modifications will appear to those skilled in the art. It is desired to include in this case all such modifications as come within the scope of the appended claims.

Having described my invention, what I claim as new and desire to secure by Letters Patent of the United States is—

1. In a system of electrical distribution, in combination, a generator, variable speed driving means therefor regulated to produce a substantially constant generator current, mains connected to said generator, a pair of storage batteries connected across said mains, an integrating meter, one terminal of one of said batteries being connected to a like terminal of the other battery and through said meter to a like terminal of said generator, and a translation circuit connected across one of said batteries through said meter, and means responsive to said meter for governing said driving means to maintain the generator voltage at a predetermined value.

2. In a system of electrical distribution, a generator, a pair of storage batteries and a lamp circuit, one of which batteries is adapted to regulate the lamp circuit while the other battery is being charged, and means responsive to the total state of charge of both batteries for causing said generator to produce a substantially constant voltage.

3. In a system of electrical distribution, a generator, a pair of storage batteries and a translation circuit, one of which batteries is adapted to regulate the translation circuit while the other battery is being charged, an integrating meter adapted to measure the net charge and discharge of both batteries, and means responsive to said meter for causing said generator to produce a substantially constant voltage.

4. In a system of electrical distribution, a generator, a pair of storage batteries, like terminals of which are connected through a common lead to one side of said generator, an integrating meter in said lead measuring the net charge and discharge of both batteries, and means responsive to said meter to cause said generator to produce a substantially constant voltage.

5. In a system of electrical distribution, in combination, a generator, a translation circuit, a pair of storage batteries having a common lead, one of said batteries being connected to be charged while the other battery is connected to regulate said translation circuit, an ampere hour meter in said common lead measuring the net charge and discharge of both batteries, variable speed driving means for said generator, and means responsive to said ampere hour meter for controlling said driving means to cause said generator to develop a substantially constant voltage.

6. In a system of electrical distribution, in combination, a generator whose position is adjustable, a translation circuit, variable speed driving means for said generator, automatic means for adjusting the position of said generator to maintain a constant current output, a pair of storage batteries, one of which batteries is adapted to regulate the translation circuit while the other is on charge, an integrating meter for measuring the net charge and discharge of said batteries, and means responsive to said meter for causing adjustment of said generator to cause same to develop a substantially constant voltage.

In witness whereof, I have hereunto subscribed my name.

WILLIAM A. TURBAYNE.